United States Patent [19]

Ohms

[11] Patent Number: 4,987,361
[45] Date of Patent: Jan. 22, 1991

[54] SWITCHING REGULATOR HAVING A CONSTANT CURRENT THROUGH ITS INDUCTANCE

[75] Inventor: Franz Ohms, Oberrot, Fed. Rep. of Germany

[73] Assignee: ANT Nachrichtentechnik GmbH, Backnang, Fed. Rep. of Germany

[21] Appl. No.: 434,027

[22] Filed: Nov. 9, 1989

[30] Foreign Application Priority Data

Nov. 12, 1988 [DE] Fed. Rep. of Germany ....... 3838408

[51] Int. Cl.⁵ .......................................... H02M 3/156
[52] U.S. Cl. ...................................... 323/222; 323/288
[58] Field of Search ................... 363/21; 323/222, 288

[56] References Cited

U.S. PATENT DOCUMENTS

| | | | |
|---|---|---|---|
| 4,674,020 | 6/1987 | Hill | 323/222 |
| 4,717,994 | 1/1988 | Diaz et al. | 323/288 |
| 4,816,982 | 3/1989 | Severinsky | 363/285 |
| 4,837,495 | 6/1989 | Zansky | 363/21 |
| 4,885,674 | 12/1989 | Varga et al. | 363/21 |

FOREIGN PATENT DOCUMENTS 2920166 10/1987 Fed. Rep. of Germany .

OTHER PUBLICATIONS

Redl et al., "Switching Mode Power Converters...", Powercon 7, pp. 1–16, Mar. 25–27, 1980.

*Primary Examiner*—William H. Beha, Jr.
*Attorney, Agent, or Firm*—Spencer & Frank

[57] ABSTRACT

A switching regulator which substantially suppresses effects on the output voltage of noise in a direct input voltage includes a direct voltage source for producing an input voltage, and output, and a controllable electronic switch connected between the voltage source and the output, an inductance connected between the voltage source and the switch, a pulse with modulator for controlling the switch, a first saw tooth signal producing device for supplying to the pulse width modulator a saw tooth signal, and a device for producing a current proportional voltage which is proportional to current through the inductance. This current proportional voltage is supplied to the pulse width modulator. In order to substantially suppress the effects of noise on the output voltage, a second saw tooth signal is supplied to the pulse width modulator which has an amplitude proportional to a negative value of the input voltage, and supplying a further signal to the pulse width modulator which has an amplitude which is a function inversely proportional to the value of the input voltage for maintaining the arithmetic mean of the current through the inductance constant.

7 Claims, 2 Drawing Sheets

SWITCHING REGULATOR HAVING A CONSTANT CURRENT THROUGH ITS INDUCTANCE

CROSS REFERENCE TO RELATED APPLICATION

The present disclosure relates to the subject matter of U.S. patent application Ser. No. 07/399,119, filed Aug. 24, 1989.

BACKGROUND OF THE INVENTION

The present invention is drawn to a switch or boost regulator apparatus and a method of operating the switching regulator apparatus, in which the switching regulator has a setting member or controllable electronic switch means which is controlled by a pulse width modulator, the pulse width modulator receiving a sawtooth-shaped signal having an approximately constant maximum amplitude and a signal dependent upon the current through the switching regulator inductance.

A switching regulator in which there is combined control of the setting member or controllable electronic switch means in dependence on a sawtooth-shaped signal and a switch current proportional signal is disclosed in German Patent No. DE-2,920,166.C2. Such a switching regulator has high stability, particularly against the tendency to oscillate even in cases in which its keying ratio (switch conductive period to OFF period) is more than one-half of a period of the switching frequency in duration.

It is known to change the keying ratio (on-to-off duration ratio) as a function of a switching regulator in that the amplitude of a sawtooth-shaped signal is changed in dependence on the magnitude of the input voltage as shown in the publication "Schaltnetzteile—Motorensteuerungen" [Switching Network Components—Motor Controls], published by Dr. Alfred Hüthig Verlag, Heidelberg, 1982, at pages 101-102. However, this publication does not provide a suggestion as to how to operate a switching regulator to optimally suppress a noise voltage in the input voltage.

For example, a problem with the prior art switch controllers can occur due to the presence of alternating components in the otherwise steady input voltage of the switch controller, particularly CS noise (conducted susceptibility), which can adversely affect the operation of the switching regulator.

SUMMARY OF THE INVENTION

It is an object of the present invention to provide an improved switching or boost regulator apparatus and method of operating the apparatus, so that the influence of noise signals in the direct input voltage on the output voltage of the switching regulator is substantially suppressed.

This is accomplished according to the invention by supplying a second sawtooth-shaped signal to the pulse width modulator whose maximum amplitude depends on the negative value of the direct input voltage of the switching regulator and, in order to keep constant the arithmetic mean of the current flowing toward the output end of the switch controller, a signal is supplied to the pulse width modulator which is inversely proportional to the value of the direct input voltage supplied to the switching regulator.

A switching regulator according to the invention includes a direct voltage source for producing an input voltage; an output; a controllable electronic switch connected between the voltage source and the output for switching the input voltage to the output; an inductance connected between the input voltage and the controllable electronic switch; a pulse width modulator connected for controlling the electronic switch; a first sawtooth signal generator connected to the pulse width modulator for feeding the pulse width modulator a sawtooth signal of approximately constant amplitude; an inductance connected between the input voltage and the controllable electronic switch, and further including a second sawtooth signal generator connected to the pulse width modulator for feeding the pulse width modulator a sawtooth signal having an amplitude which is proportional to the negative value of the input voltage, and a further signal means connected to the pulse width modulator for producing a signal having an amplitude which is an inversely proportional function of the magnitude of the input voltage of the input voltage source for maintaining the arithmetic mean of the current through the inductance constant.

The present invention provides the following advantages. Alternating components in the direct input voltage of the switch regulator, particularly CS noise (conducted susceptibility), are attenuated considerably. Therefore, the expenditures for filtering means to filter these alternating components in the direct input voltage, which is supplied to the load circuit of the switch regulator, can be kept very low. Stability problems are reduced or do not occur. In operating the switch regulator according to the present invention, the arithmetic mean of the current through the inductance of the switch regulator is caused to be independent of the direct input voltage, and therefore the current through the inductance is likewise independent of alternating components which may be caused by alternating components present in the direct input voltage.

BRIEF DESCRIPTION OF THE DRAWING FIGURES

The invention will now be described in greater detail with reference to the drawing figures.

DETAILED DESCRIPTION OF THE PREFERRED EMBODIMENT

Figure 1:
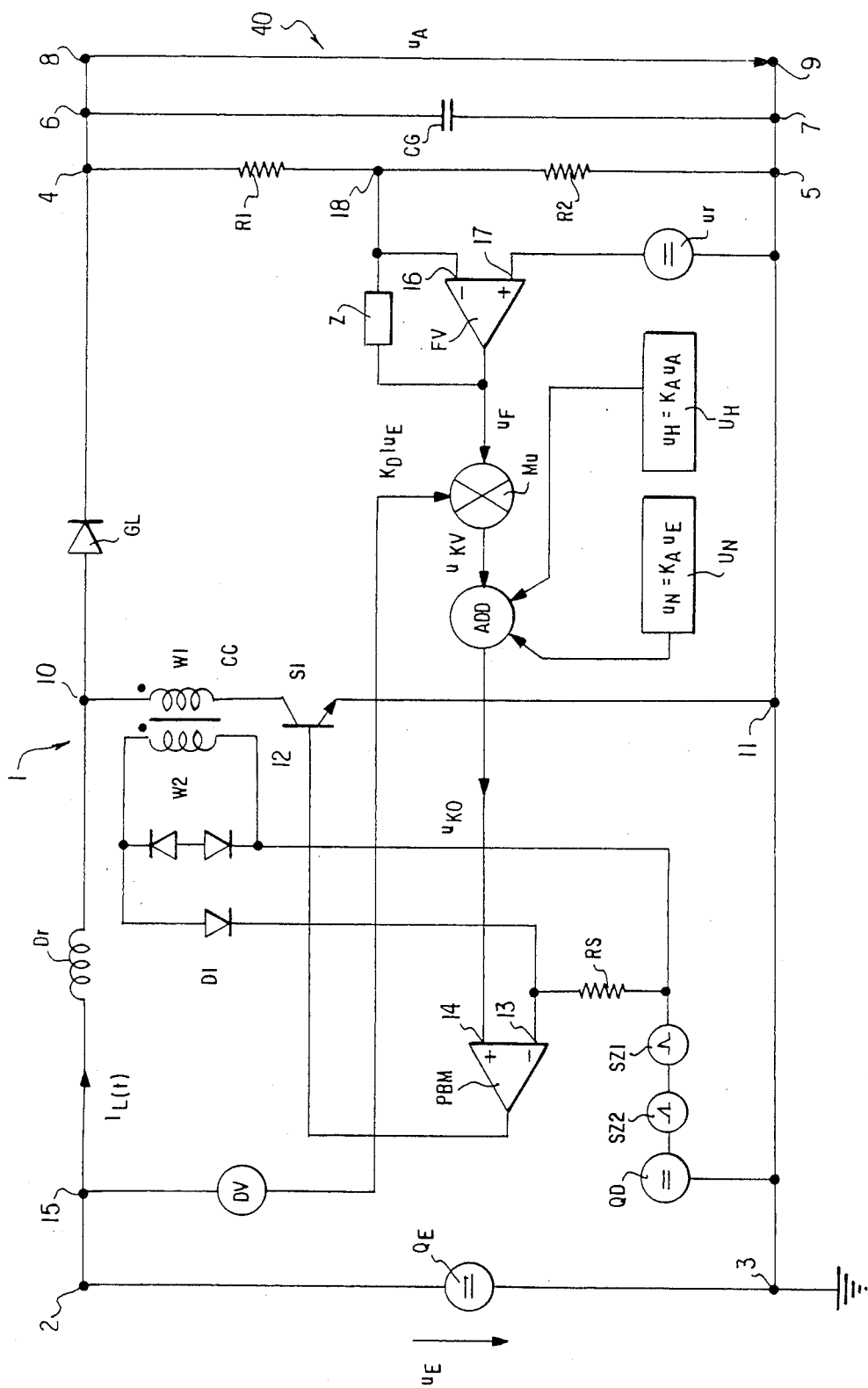
FIG. 1 is a basic circuit diagram of a switching regulator according to the invention.

A switching regulator or boost (upward) regulator 1 is shown in FIG. 1 which includes a direct input voltage source $Q_E$ which has a terminal voltage $U_E$. A switching regulator inductance or choke Dr is in series connection with a rectifier GL between a positive terminal 2 of the direct input voltage source $Q_E$ and a positive terminal 8 at an output means or end 40 of the switching regulator 1 having an output voltage $U_A$.

A smoothing capacitor CG is disposed at the output end 40 of the switching regulator 1 between an upper terminal 6 and a lower terminal 7. A switching regulator setting member or controllable electronic switch means S1 is shown which is in the form of a bipolar transistor which is disposed between a terminal 10—located between the choke Dr and the rectifier GL—and a terminal 11 connected with a negative terminal 3 of the direct input voltage source $Q_E$.

The setting member or controllable electronic switch means S1 has a base 12 connected to the output of a pulse width modulator PBM. The setting member or controllable electronic switch means S1 has a conductive period which is controlled by way of signals supplied by the pulse width modulator PBM. The following applies for this duty cycle D.

$$D = 1 - U_E/U_A$$

The duty cycle D indicates for which time t of a period T the setting member S1 is turned on (D=t/T). The pulse width modulator PBM is configured as a comparator. The pulse width modulator PBM has an inverting input 13 which is connected in series with a current measuring resistor RS for measuring the current $I_{L(t)}$ through the choke Dr, a first sawtooth generator (SZ1, a second sawtooth generator SZ2, and a direct voltage source QD. The direct voltage source QD has a direct voltage which is selected to be greater than an auxiliary direct voltage source $U_H$. The pulse width modulator PBM has a non-inverting input 14 which is connected to the output of an adder ADD which additively links the following signals together:
  a signal $U_N$, having a value $U_N = -K_A \cdot U_E$, where $K_A$ is a proportionality constant;
  the auxiliary direct voltage $U_H$, having a value $U_H = -K_A \cdot U_A$; and
  a signal $U_{KV}$, which is the output signal of a multiplier MU.

The sawtooth generator SZ1 produces an output signal which has a value $U_{SK(t)}$ as a function of time as follows:

$$U_{SK(t)} = \hat{U}_{SK} \cdot t/T$$

The value $U_{SK(t)}$ has a maximum amplitude $\hat{U}_{SK}$, where $\hat{U}_{SK}$ is selected to have a value $\hat{U}_{SK} = K_A \cdot U_A$. The value $\hat{U}_{SK}$ becomes approximately constant due to the regulation according to the invention of the output voltage $U_A$.

The sawtooth generator SZ2 produces an output signal which has a value $U_{SV(t)}$ as a function of time as follows:

$$U_{SV(t)} = \hat{U}_{SV} \cdot t/T$$

The value $U_{SV(t)}$ has a maximum amplitude $\hat{U}_{SV}$, where $\hat{U}_{SV}$ is selected to have a value $$U_{SV} = -\frac{T \cdot R_M}{2L} \cdot U_E$$

In the above equation, the symbol $R_M$ represents the resistance of the current measuring resistance RS divided by the current converter ratio W2/W7 and the symbol L represents the inductance of the choke Dr. The resistance $R_M$, when multiplied with the value of the current $I_{L(t)}$ through the choke Dr, results in a current proportional voltage which is proportional to the value of the current at the choke Dr, the current proportional voltage being supplied at the inverting input 13 of the pulse width modulator PBM. That is, a current converter CC disposed between terminal 10 and the collector of electronic switch S1 is used to obtain the choke current proportional signal during conduction of electronic switch S1 supplied through the current measuring resistor RS. For example, the current converter CC can be of a type having a primary winding W1 disposed between the terminal 10 of the choke Dr and the collector of switch S1, the current converter having a secondary winding W2 which is connected, by way of a rectifier D1, with the current measuring resistance RS. Such circuitry includes state of art knowledge, e.g. disclosed in European Patent No. 0027847.

Therefore, as shown in the above equation, the maximum amplitude $\hat{U}_{SV}$ is dependent on the respective negative value of the varying input voltage $U_E$. The equation for the value of the conductive ratio D determined at the pulse width modulator PBM is given as follows:

$$D = \frac{U_{KO} - I_a \cdot R_M}{R_M \cdot \frac{U_E}{L} \cdot T + U_{SZ}}$$

In the equation, $I_a$ is the minimum current through the choke Dr, and $U_{KO}$ is the value of the voltage between the non-inverting input 14 of the comparator PBM and the negative terminal 5 of the switch controller 1. The value of $\hat{U}_{SZ}$ is obtained by the equation $\hat{U}_{SZ} = \hat{U}_{SK} + \hat{U}_{SV}$.

The following applies for the maximum choke current $I_e$:

$$I_e = I_a + \frac{U_E}{L} \cdot D \cdot T$$

The choke current $I_L$, flowing to the output end 40, has an arithmetic mean $I_{ar}$ which is determined as follows:

$$I_{ar} = \frac{I_a + I_e}{2}(1 - D)$$

In order to keep this arithmetic mean $I_{ar}$ constant, i.e., in particular, independent of the varying input voltage $U_E$, the signal fed to the non-inverting input 14 of the pulse width modulator PBM must be composed of certain signal components which will be derived as indicated below. With the above equations, the arithmetic mean $I_{ar}$ can be expressed as follows:

$$I_{ar} = \frac{U_E}{U_A}\left\{\frac{U_{KO}}{R_M} - \frac{U_A - U_E}{U_A}\left[\frac{U_E \cdot T}{2L} + \frac{U_{SZ}}{R_M}\right]\right\}$$

If $\hat{U}_{SZ} = K_A \cdot U_A + K_E \cdot U_E$, it follows that:

$$I_{ar} = \frac{U_E}{U_A}\left\{\frac{U_{KO}}{R_M} - \frac{U_A - U_E}{U_A}\left[\frac{U_E \cdot T}{2L} + \frac{K_A \cdot U_A}{R_M} + \frac{K_E \cdot U_E}{R_M}\right]\right\}$$

For:

$$K_E = -\frac{T \cdot R_M}{2L}$$

the following applies:

$$I_{ar} = \frac{U_E}{U_A} \left( \frac{U_{KO}}{R_M} - K_A \frac{U_A}{R_M} + K_A \frac{U_E}{R_M} \right)$$

If $U_{KO} = U_{K1} + K_1 U_E$, the following applies:

$$I_{ar} = \frac{U_E}{U_A} \left( \frac{U_{K1}}{R_M} + \frac{K_1 U_E}{R_M} - K_A \frac{U_A}{R_M} + K_A \frac{U_E}{R_M} \right)$$

For $K_1 = -K_A$, the equation becomes:

$$I_{ar} = \frac{U_E}{U_A} \left( \frac{U_{K1}}{R_M} - K_A \frac{U_A}{R_M} \right)$$

If $U_{K1} = U_H + U_{KV}$, the following applies:

$$I_{ar} = \frac{U_E}{U_A} \left( \frac{U_{KV}}{R_M} + \frac{U_H}{R_M} - K_A \frac{U_A}{R_M} \right)$$

If $U_H = K_A \cdot U_A$, the following applies:

$$I_{ar} = \frac{U_E}{U_A} \cdot \frac{U_{KV}}{R_M}$$

If $$U_{KV} = U_F \frac{K_D}{U_E}$$

wherein $K_D$ represents a proportionality constant and $U_F$ (described in detail in the following) represents an amplified error signal of the output voltage $U_A$, it follows that:

$$I_{ar} = \frac{K_O \cdot U_R}{U_A \cdot R_M} \neq f(U_E)$$

Therefore, it is possible, by selecting the constants and the signals according to the above relationships, to cause the arithmetic mean $I_{ar}$ flowing to the output end 40 to be independent of the input voltage $U_E$ and to be, furthermore, independent of noise in input voltage $U_E$. The sole remaining free parameter $K_A$ is selected in such a manner that the switching controller 1 is stable.

The condition for stability is the following:

$$U_{SZ} > \frac{R_M \cdot T}{L} (U_A - 2U_E)$$

If $K_E$ is selected to be $$K_E = -\frac{T \cdot R_M}{2L}$$

and, since $\hat{U}_{SZ} = K_A \cdot U_A + K_E \cdot U_E$, the following must be true:

$$U_A \cdot K_A \geq \frac{R_M \cdot T}{L} (U_A - 2U_{Emin}) + \frac{T \cdot R_M}{2L} \cdot U_{Emin}$$

Thus, $K_A$ becomes:

$$K_A \geq \frac{R_M \cdot T}{L} \left( 1 - \frac{3}{2} \frac{U_{Emin}}{U_A} \right)$$

The signals supplied to the non-inverting input 14 of the pulse width modulator PBM are produced by circuit elements shown in the figure which together produce the signals necessary to obtain the above-described advantageous results, as explained in the following. An adder ADD, whose output is connected with the non-inverting input 14 of the pulse width modulator PBM, receives the following signals at its input:

$$U_N = -K_A \cdot U_E$$

that is, a signal proportional to the negative value of input voltage $U_E$;

$$U_H = K_A \cdot U_A$$

an auxiliary direct voltage which is approximately constant; and the signal $$U_{KV} = \frac{K_D}{U_E} \cdot U_F$$

which is inversely proportional to the input voltage $U_E$ and is proportional to the amplified error signal $U_F$. The signal $U_{KV}$ supplied to the adder ADD is produced by a multiplier MU which receives the signals $U_F$ and $K_D/U_E$ (which are produced as discussed in the following). The intermediate signal $U_{K1}$ is constituted as follows:

$$U_{K1} = U_{KV} + U_H$$

The intermediate signal $U_{K1}$ is present explicity only if the signal addition is performed in two stages. The signal $K_D/U_E$ can be derived relatively easily from the input voltage $U_E$ by means of a divider DV connected to a terminal 15 which is at the terminal voltage $U_E$, wherein the divider DV has a division signal which is weighted by the factor $K_D$. In this manner, the factor $K_D$ is divided by the voltage $U_E$, and the resulting signal, representing the value $K_D/U_E$, is supplied to the multiplier MU. The error signal $U_F$ is obtained by means of an error amplifier FV. The error amplifier FV has a noninverting terminal 17 which receives the output of a direct reference voltage source Ur, and an inverting terminal 16 which is connected to a terminal 18 located between a pair of resistors R1 and R2. The resistors R1 and R2 constitute a voltage divider such that, at the terminal 18, a signal is obtained which is proportional to the output voltage $U_A$. A commonly used two terminal network as feedback network having an impedance Z is provided in a feedback branch of the error amplifier FV. As can be easily derived in FIG. 1:

$$U_F = Ur \left( 1 + \frac{Z(R1 + R2)}{R1 \cdot R2} \right) - \frac{Z}{R1} \cdot U_A$$

Figure 2:
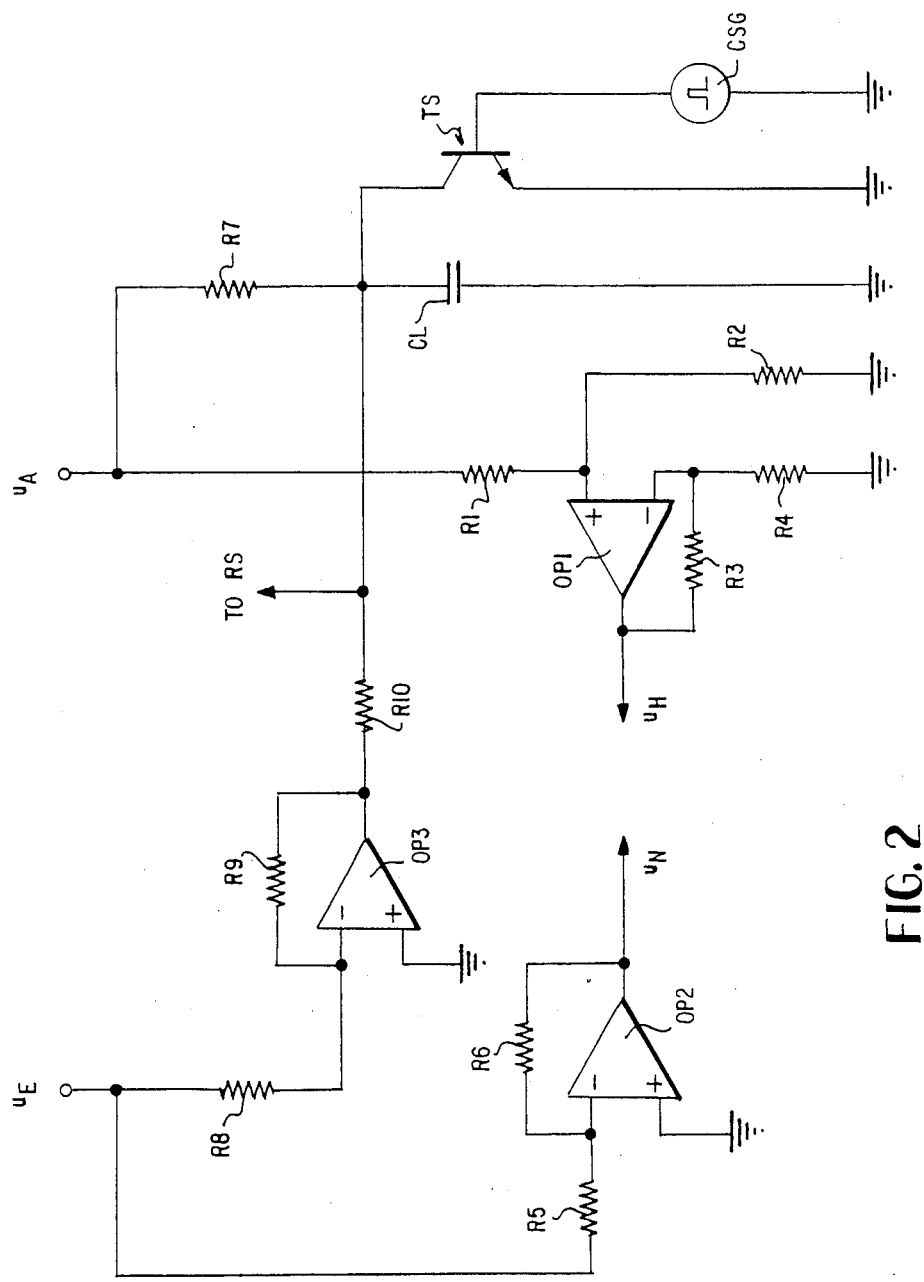
FIG. 2 is a circuit diagram to derive some of the control signals.

The auxiliary voltage $U_H$ can be derived directly from the output voltage $U_A$, for example by way of a voltage divider shown in FIG. 2. The amplitudes of the respective sawtooth signals $U_{SK(t)}$ and $U_{SV(t)}$ from the sawtooth generators SZ1 and SZ2 are dependent upon $Û_{SK}$ and $Û_{SV}$, and the amplitudes of these signals can be derived in a straightforward manner using circuit elements which implement the relationships based on the equations discussed in the above from the input voltage $U_E$ and the output voltage $U_A$, respectively.

The pulse width modulator which is configured as a comparator is followed by a flip-flop, being reset at the beginning of every switching cycle. Such pulse width modulators are available as integrated circuits, e.g. the SG1524B.

FIG. 2 shows the circuitry to derive the other control signals. Auxiliary voltage $U_H$ is derived from the output voltage $U_A$ via a voltage divider consisting of the resistances R1, R2. The common connection of resistors R1, R2 is connected to an operational amplifier OP1 via its non-inverting input. Operational amplifier OP1 has a feedback resistance R3 connected to a grounding resistance R4. The output signal $U_H$ of operational amplifier OP1 is proportional to output voltage $U_A$. The way of deriving the signal $U_N$ is quite similar, using an operational amplifier OP2. The difference here is that signal $U_N$ is derived from the input voltage $U_E$ via resistor R5 connected to the inverting input of operational amplifier OP2. A feedback resistor R6 is also connected to the inverting input of operational amplifier OP2.

FIG. 2 also shows the means for combining the first and second sawtooth generators. Output voltage $U_A$ is fed to a capacitor CL via a load resistor R7. A transistor TS in parallel to capacitor CL determines discharging periods of capacitor CL. Transistor TS is controlled via its base electrode by a clock signal generator CSG, which resets capacitor CL with every clock pulse. The signal period of clock signal generator CSG is T thus producing an output signal:

$$U_{SK(t)} = Û_{SK} \cdot t/T \text{ with } Û_{SK} = K_A \cdot U_A.$$

This signal proportional to output voltage $U_A$ is combined with the signal whose amplitude is proportional to the negative value of the input voltage $U_E$. For this purpose input voltage $U_E$ is fed via resistor R8 to the inverting input of operational amplifier OP3. This operational amplifier OP3 has a feedback resistor R9. The output signal of this operational amplifier OP3, negative proportional to the input voltage $U_E$ is fed via resistor R10 to the capacitor CL. The charging amplitude of capacitor CL is therefore determined by the output voltage $U_A$ and the output signal of operational amplifier OP3.

It will be understood that the above description of the present invention is susceptible to various modifications, changes and adaptations, and the same are intended to be comprehended within the meaning and range of equivalents of the appended claims.

What is claimed is:

1. In a switching regulator including: a direct voltage source for producing an input voltage; output means; controllable electronic switching means connected between the voltage source and the output means for switching the input voltage to the output means; an inductance connected between the voltage source and the controllable electronic switch means; a pulse width modulator connected for controlling the electronic switch means; a first sawtooth signal means connected to the pulse width modulator for feeding the pulse width modulator a sawtooth signal of approximately constant amplitude; and means for producing a current proportional voltage which is proportional to current through the inductance and feeding the current proportional voltage to the pulse width modulator, the improvement comprising:
a second sawtooth signal means connected to the pulse width modulator for feeding the pulse width modulator a sawtooth signal of amplitude which is proportional to the negative value of the input voltage; and
further signal means connected to said pulse width modulator for feeding said pulse width modulator a further signal having an amplitude which is an inversely proportional function of the magnitude of the input voltage of said input voltage source for maintaining the arithmetic mean of the current through the inductance constant.

2. A switching regulator as defined in claim 1, wherein said pulse width modulator has an inverting input and a noninverting input; and said means for producing a current proportional voltage, said first sawtooth generator, and said second sawtooth generator are connected in series to said inverting input; and further comprising: means for producing a signal proportional to the negative value of the input voltage; means for producing an approximately constant auxiliary direct voltage; means for producing a signal which is composed of an amplified fault signal of the output voltage of said output means; combining means fed by said amplified fault signal and said signal which is inversely proportional to the input voltage for producing a combined output signal; an adder being fed by said combined output signal, said auxiliary direct voltage, and said signal proportional to the negative value of the input voltage for producing a sum signal; said adder being connected to said non-inverting input of said pulse width modulator.

3. A switching regulator as defined in claim 2, wherein said combining means is a multiplier means for multiplying said amplified fault signal with said signal inversely proportional to the input voltage.

4. A switching regulator as defined in claim 2, further comprising an additional direct voltage source whose source voltage is greater than said auxiliary direct voltage, and wherein said first and second sawtooth generators and said means for producing a current proportional voltage are connected in series with said additional direct voltage source.

5. A switching regulator as defined in claim 4, wherein said means for producing the auxiliary direct voltage is connected to said output means, and the auxiliary direct voltage is derived from the output voltage of said output means.

6. A switching regulator as defined in claim 2, further comprising means for combining said first and second sawtooth generators into a single source.

7. A method of operating a boost regulator as a type of switching regulator including: a direct voltage source for producing an input voltage; output means; controllable electronic switch means connected between the voltage source and the output means for switching the input voltage to the output means; an inductance connected between the voltage source and the controllable electronic switch means; a pulse width modulator connected for controlling the electronic switch means; a first sawtooth signal means connected to the pulse width modulator for feeding the pulse width modulator a sawtooth signal of approximately constant amplitude; and means for producing a current proportional voltage which is proportional to current through the inductance and feeding the current proportional voltage to the pulse width modulator, comprising the steps of:

feeding said pulse width modulator a second sawtooth signal having an amplitude which is proportional to the negative value of the input voltage; and feeding said pulse width modulator a further signal having an amplitude which is a function inversely proportional to the value of said input voltage for maintaining the arithmetic mean of the current through said inductance constant.

* * * * *